United States Patent [19]

Netravali et al.

[11] 4,383,272
[45] May 10, 1983

[54] VIDEO SIGNAL INTERPOLATION USING MOTION ESTIMATION

[75] Inventors: Arun N. Netravali, Westfield; John D. Robbins, Aberdeen, both of N.J.

[73] Assignee: Bell Telephone Laboratories, Incorporated, Murray Hill, N.J.

[21] Appl. No.: 253,698

[22] Filed: Apr. 13, 1981

[51] Int. Cl.³ .............................................. H04N 7/12
[52] U.S. Cl. .................................. 358/136; 358/138; 358/105
[58] Field of Search ............... 358/136, 133, 105, 138; 375/28; 364/518, 521

[56] References Cited

U.S. PATENT DOCUMENTS 4,218,703 8/1980 Netravali et al. .................... 358/136
4,218,704 8/1980 Netravali et al. .................... 358/136
4,232,338 11/1980 Netravali et al. .................... 358/136
4,307,420 12/1981 Ninomiya et al. ................. 358/136

Primary Examiner—Benedict V. Safourek
Assistant Examiner—Edward L. Coles
Attorney, Agent, or Firm—Barry H. Freedman

[57] ABSTRACT

Information defining elements of a picture is estimated by interpolation using information from related locations in preceding and succeeding versions of the picture. The related locations are determined by forming an estimate of the displacement of objects in the picture. Displacement estimates are advantageously formed recursively, with updates being formed only in moving areas of the picture. If desired, an adaptive technique can be used to permit motion compensated interpolation or fixed position interpolation, depending upon which produces better results.

24 Claims, 4 Drawing Figures

PRIOR ART INTERPOLATION

VIDEO SIGNAL INTERPOLATION USING MOTION ESTIMATION

TECHNICAL FIELD

This invention relates generally to interpolation of video signals and, in particular, to interpolation of video signals using motion estimation.

BACKGROUND OF THE INVENTION

In various schemes for interframe coding of television pictures, it is advantageous to drop or discard information from some fields or frames by subsampling the video signal at a fraction of the normal rate. This is done in order to prevent overflow of the data rate equalization buffers disposed in the transmission path, or simply to increase the efficiency of the encoder by removing redundant information. At the receiver, a reconstructed version of the information contained in the nontransmitted fields or frames is obtained by interpolation, using information derived from the transmitted fields. Simple linear interpolation may be performed by averaging the intensity information defining picture elements (pels) in the preceding and succeeding transmitted fields at fixed locations which are most closely related to the location of the picture element that is presently being processed. In certain instances, the interpolation may be performed adaptively, such that the pels used to form certain reconstructed or estimated intensity values are selected from two or more groups having different spatial patterns or such that the information obtained from pels in the same relative spatial positions in the prior and succeeding frames are combined in two or more different ways.

Both the aforementioned fixed and adaptive interpolative techniques are adequate to estimate and thus recover the nontransmitted picture information when little motion occurs in the picture. However, where objects, particularly those with a high degree of detail, are moving quickly in the field of view of the television camera, dropping fields or frames in the encoder and subsequent reconstruction using interpolation often causes blurring and other objectionable visual distortion. Accordingly, the broad object of the present invention is to enable improved estimation of intensity information defining elements in a picture using interpolative techniques on information derived from preceding and succeeding versions of the picture. A specific object is to improve the reconstruction of a nontransmitted field of a video signal using information from previous and succeeding fields, so as to eliminate annoying distortion and flicker.

SUMMARY OF THE INVENTION

The foregoing and additional objects are achieved in accordance with the instant invention by estimating the intensity information defining elements in a picture (which may be a nontransmitted field or other portion of a video signal) based on information defining pels in related locations in preceding and succeeding versions of the same picture, using an interpolative technique which takes account of the motion of objects in the picture to identify the related locations. More specifically, apparatus for estimating the desired intensity information includes a recursive motion estimator for providing an indication of the displacement of objects between the two available versions of the picture which precede and follow the picture being processed and an interpolator arranged to utilize information defining pels at the appropriate displaced locations within the preceding and succeeding versions to form an estimate of the desired information. In a preferred embodiment, an adaptive technique is used to switch between displacement compensated interpolation and fixed position interpolation, depending upon which produces the best results in the local picture area.

BRIEF DESCRIPTION OF THE DRAWING

The features and advantages of the present invention will be more readily understood from the following detailed description when read in light of the accompanying drawing in which.

DETAILED DESCRIPTION

Figure 1:
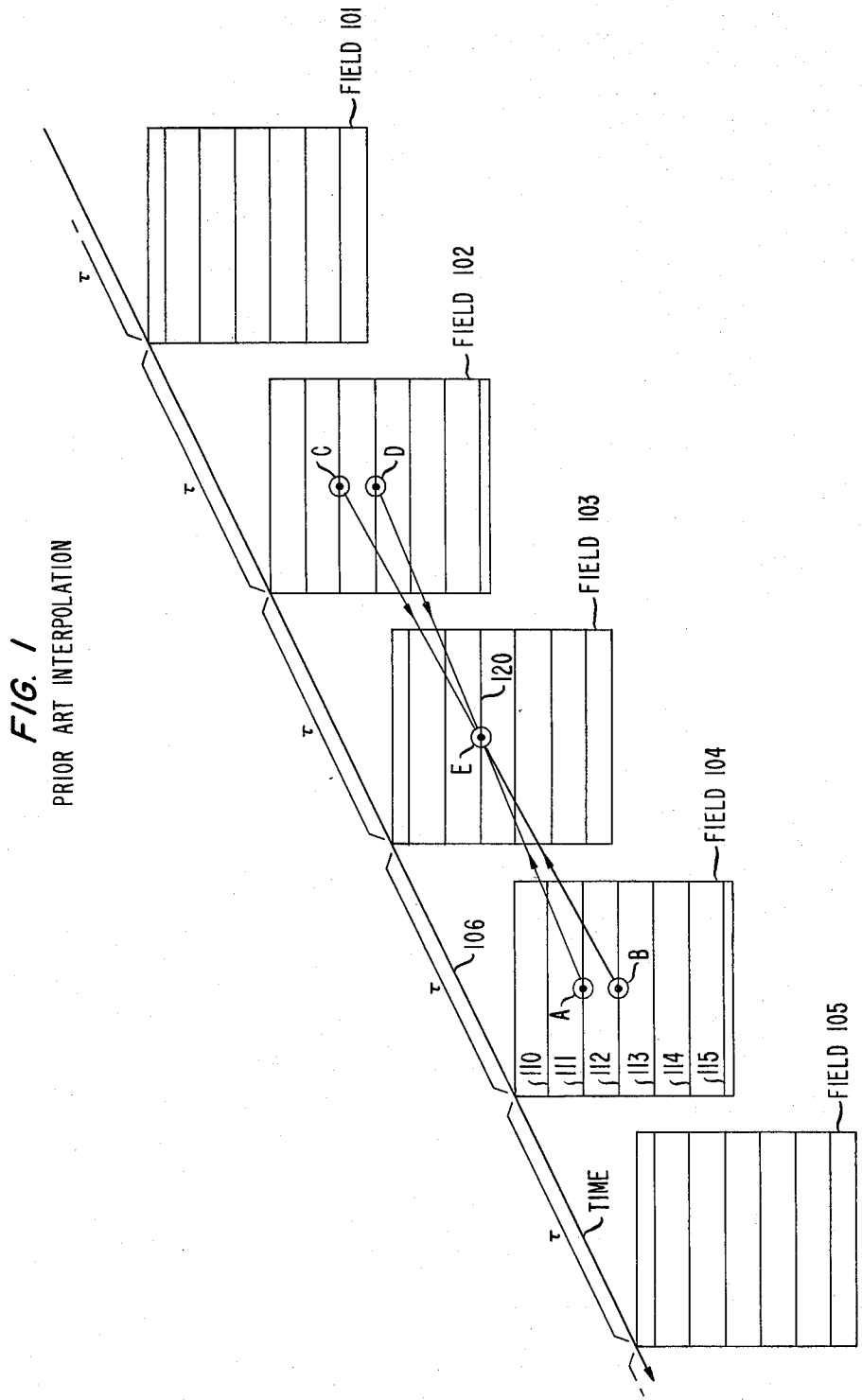
FIG. 1 is a representation of a series of video fields indicating the locations of picture elements used to form estimates of nontransmitted information in accordance with prior art fixed position interpolative techniques.

One embodiment of the present invention, which permits reconstruction of a nontransmitted field of a video signal using information derived from transmitted preceding and succeeding fields, will be better appreciated by consideration of FIG. 1, which illustrates the time-space relationship of a sequence of television fields 101-105, each of which can be thought of as a "snapshot" or version of a moving picture which is electrically represented by the video signal being processed. Vector 106 indicates the direction of time progression, such that field 101 occurs first and is followed in succession by fields 102 . . . 105. The time interval between successive fields is given by $\tau$, and is generally 1/60$^{th}$ of a second for conventional video encoding. Each field is obtained by scanning the picture being processed along a plurality of generally parallel scan lines, such as lines 110-115 in field 104. In order to conserve bandwidth, a conventional video signal generator is arranged to interlace the scan lines in each pair of successive fields. Thus, each line in an odd numbered field is offset from the corresponding line in the previous (and next) field by half the distance between adjacent lines. The NTSC standard requires a total of 525 scan lines for each pair of fields, which together constitute a frame.

Assuming that even numbered fields 102 and 104 shown in FIG. 1 were encoded for transmission using conventional subsampling and/or other compression techniques, and that these fields have been reconstructed at the receiver, it is known to reconstruct information defining pels in the nontransmitted odd fields 101, 103 and 105 by interpolation. As used herein, "information" can include intensity information describing the different color components (red, green and blue) of a composite signal or combinations thereof, such as luminance and chrominance information. Using "intensity" generally in the foregoing sense, to reconstruct or estimate the intensity value $I_E$ for a pel E on line 120 in field 103, it is typical to use intensity information from spatially corresponding locations in the transmitted preceding field 102 and the succeeding field 104. Since the scan lines in the even and odd fields are offset from one another, the intensity values in fields 102 and 104 at the precisely corresponding spatial location of pel E are not available. However, intensity values for pels on the scan lines just above and just below line 120 may be used. Thus, the intensity of pel E can be estimated as the average $(I_A+I_B+I_C+I_D)/4$ of the intensities of pels A and B in field 104 and pels C and D in field 102. As stated previously, this fixed position interpolation procedure for reconstructing the nontransmitted fields is generally satisfactory, as long as objects in the picture are relatively still. However, in areas of the picture which are changing quickly, the reconstructed version generally appears noticeably blurred and distorted. This significantly reduces the utility of the subsampling, and limits the number of fields which may be dropped at the transmitter and successfully recovered at the receiver.

The motion compensated interpolation strategy of the present invention, again considered in the context of reconstruction of a nontransmitted field using information from preceding and succeeding fields which are available at the receiver, can be explained by reference to FIG. 2, which again depicts the time-space relationship of a series of fields 201 . . . 205. For the sake of generality, it is assumed that $K_1$ field intervals $\tau$ including field 202 intervene between the previous transmitted field 201 and the present (nontransmitted) field 203, and that $K_2$ field intervals including field 204 intervene between field 203 and the succeeding transmitted field 205. $K_1$ and $K_2$ are, of course, positive integers. In order to obtain an estimate of the intensity value of each pel in nontransmitted field 203, it is first necessary to form an estimate D of the displacement per field interval of moving objects in the picture between the transmitted fields 201 and 205 which bracket field 203. The underscore used for the variable D and hereinbelow indicates a vector having components in the horizontal (picture element to element) and vertical (scan line to line) directions. It is assumed here that objects in the pictures being processed are in simple uniform translation during this period. Second, the intensity values at the displaced locations in the previous and succeeding transmitted fields which "correspond" to the location in the field being processed are determined. As used here, the "correspondence" indicates locations at which the same object is expected to be in different versions of the picture. Finally, the desired intensity value is derived using interpolation or averaging.

To illustrate, if the position of a presently processed pel 250 in field 203 is denoted by vector x, then the location of the "corresponding" displaced pel 260 in field 201 is given by $x-K_1D$ and the intensity at that location is written $I(x-K_1D,t-K_1\tau)$. Similarly, the location in field 205 of pel 270 which contains the object depicted in pel 250 is given by $x+K_2D$, and the intensity at this location is $I(x+K_2D,t+K_2\tau)$. In this example, the desired intensity value $I(x,t)$ for pel 250 is determined by interpolation, such that:

$$I(x, t) = \frac{1}{K_1 + K_2} [K_1 I(x + K_2D, t + K_2\tau) + \qquad (1)$$

$$K_2 I(x - K_1D, t - K_1\tau)].$$

From Equation (1) it is seen that interpolation produces a weighted average of intensity values from fields displaced timewise from the present field 203. If $K_1 > K_2$, field 203 is closer in time to field 205, and more weight is given to the intensity value information derived from the latter. On the other hand, if $K_2 > K_1$, more weight is given to the intensity value $I(x-K_1D,t-K_1t)$ from field 201. When alternate field subsampling is used, $K_1=K_2=1$ and the interpolated intensity value $I(x,t)$ is a simple average of $I(x+D,t+\tau)$ and $I(x-D,t-\tau)$.

With respect to formation of the displacement estimate D, it must be understood that the magnitude and direction of this vector varies, in a real television scene, as a function of both time and space. Accordingly, the intensity values at pels 250, 260 and 270 are not likely to be exactly equal. For convenience, a displaced frame difference $DFD(x,D)$ which is a function both of location x and displacement estimate D, is defined such that:

$$DFD(x,D)=I(x+K_2D,t+K_2\tau)-I(x-K_1D,t-K_1\tau) \qquad (2)$$

To estimate the value of D, it is advantageous to minimize $|DFD(x,D)|^2$ recursively for every pel position x within the moving area of the picture. This is analogous to minimizing mean square error (since DFD is an error indicator) and can be done using a steepest descent technique. Thus:

$$D^{i+1} = D^i - \frac{\epsilon}{2} \nabla_D [DFD(x, D)]^2 \mid D = D^i \qquad (3)$$

$$= D^i - \epsilon DFD(x, D^i) \nabla_D [DFDx, D,] \mid D = D^i \qquad (4)$$

$$= D^i - \epsilon DFD(x, D^i) \begin{bmatrix} K_2 \cdot ED(x + K_2D^i, t + K_2\tau) + \\ K_1 \cdot ED(x - K_1D^i, t - K_1\tau) \\ K_2 \cdot LD(x + K_2D^i, t + K_2\tau) + \\ K_1 \cdot LD(x - K_1D^i, t - K_1\tau) \end{bmatrix} \qquad (5)$$

In Equations (3)–(5), $D^i$ is a present estimate of the displacement vector D and $D^{i+1}$ is the next estimate, with the recursion being performed for each picture element $i=1, 2, \ldots$. The symbol $\nabla_D$ indicates a gradient or spatial rate of change calculated assuming a displacement vector D. In the horizontal picture direction, the rate of change can be determined from "element differences" $ED(x,t)$, i.e., the intensity differences between successive picture elements on a single scan line evaluated at the location x in the field occurring at time t. The rate of change in the vertical direction is similarly determined from "line differences" $LD(x,t)$ which are intensity differences between pels in the same horizontal position on difference scan lines, again evaluated at the location x in the field occuring at time t. Scaling factor $\epsilon$ is used in Equations (3) through (5) to limit large changes; $\epsilon$ is always less than one and is preferably in the range of 0.1 to 0.001. Further details concerning the recursive displacement estimation technique described herein may be obtained from applicants' U.S. Pat. No. 4,218,703 issued Aug. 19, 1980.

The displacement recursion specified in Equations (3)–(5) is carried out only in the moving areas of the picture. These areas can be identified when the frame difference, denoted $FD(x)$, has a magnitude which exceeds a preselected threshold value. The frame difference is defined as the intensity difference, at pel location x, as measured in the previous and succeeding frames. Thus:

$$FD(x) = I(x, t + K_2\tau) - I(x, t - K_1\tau). \quad (6)$$

While it is possible to implement the interpolation specified in Eq. (1) and the displacement estimation specified in Eq. (5), several simplifications can significantly reduce circuit complexity. For example, the displacement estimates calculated in Equations (3)–(5) require several multiplications for each iteration. This can be reduced by considering only the sign of the two right-hand terms, i.e., $$D^{i+1} = D^i - \quad (7)$$
$$\epsilon SIGN(DFD(x, D^i)) \cdot SIGN\{\nabla_D[DFD(x, D)] \mid D = D^i\}$$

where the SIGN function is defined by $$SIGN(Z) = \begin{cases} 0, & \text{if } |Z| < T \\ \frac{Z}{|Z|}, & \text{otherwise,} \end{cases} \quad (8)$$

where T is a small non-negative number. A second simplification results by use of spatial gradients in only one transmitted field rather than in both the previous and succeeding fields. This modification simplifies Eq. (5) as follows:

$$D^{i+1} = D^i - \epsilon DFD(x, D^i) \begin{bmatrix} K_2 \text{ (el. diff. at } x + K_2D^i) \\ K_2 \text{ (line diff. at } x + K_2D^i) \end{bmatrix} \quad (9)$$

Yet another modification is quite desirable in order to simplify the hardware implementation described below. In this modification, the present displacement estimate $D^i$ is used to compute the intensity value I(x,t) in Equation (1), instead of the next displacement estimate $D^{i+1}$ which more precisely belongs in the intensity value equation. This modification permits the same set of intensity values to be used for both the computation of the displacement estimate and the interpolation of the missing field intensity values.

While it is not essential in practicing the present invention, an adaptive technique is preferred in the interpolative recovery of nontransmitted fields, such that "displacement compensated interpolation" in accordance with the present invention is used instead of conventional "fixed position" interpolation only when it produces better results. Switching between the two types of interpolation is accomplished under the control of adaption logic which compares the magnitude of the frame difference FD(x) and the displaced frame difference DFD(x,D) to determine which is smaller. If DFD(x,D) < FD(x), displacement compensation is better, and Equation (1) is used in the interpolation. If the frame difference is smaller, the interpolated intensity I(x,t) value is computed conventionally using the same location in the previous and succeeding transmitted fields, as follows:

$$I(x, t) = \frac{1}{K_1 + K_2} [K_1 I(x, t + K_2\tau) + K_2 I(x, t - K_1\tau)]. \quad (10)$$

Figure 2:
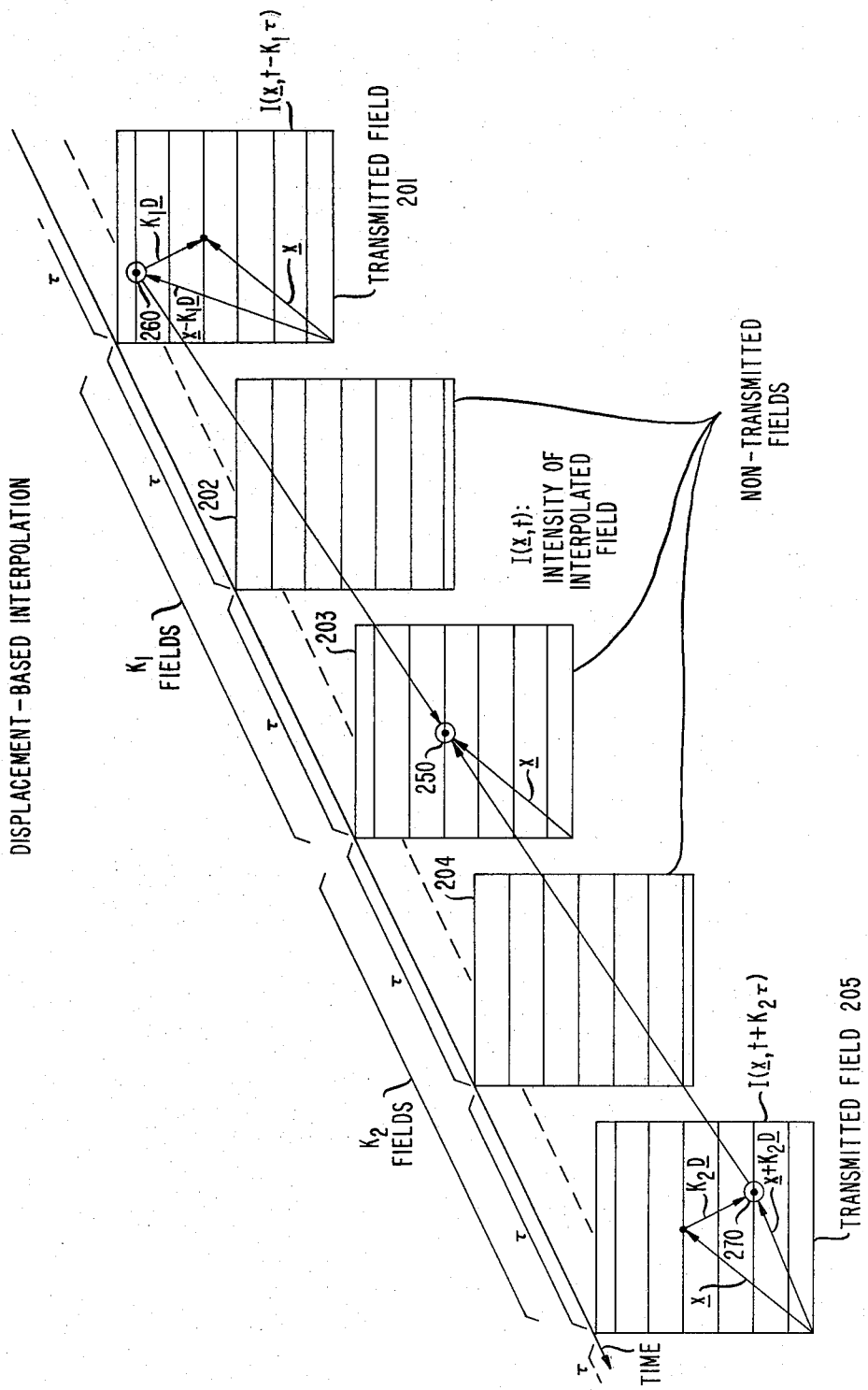
FIG. 2 is a similar representation of a series of video fields indicating the displaced pel locations in the preceding and succeeding frames used to estimate the information defining the presently processed picture element in accordance with the present invention.
Figure 3:
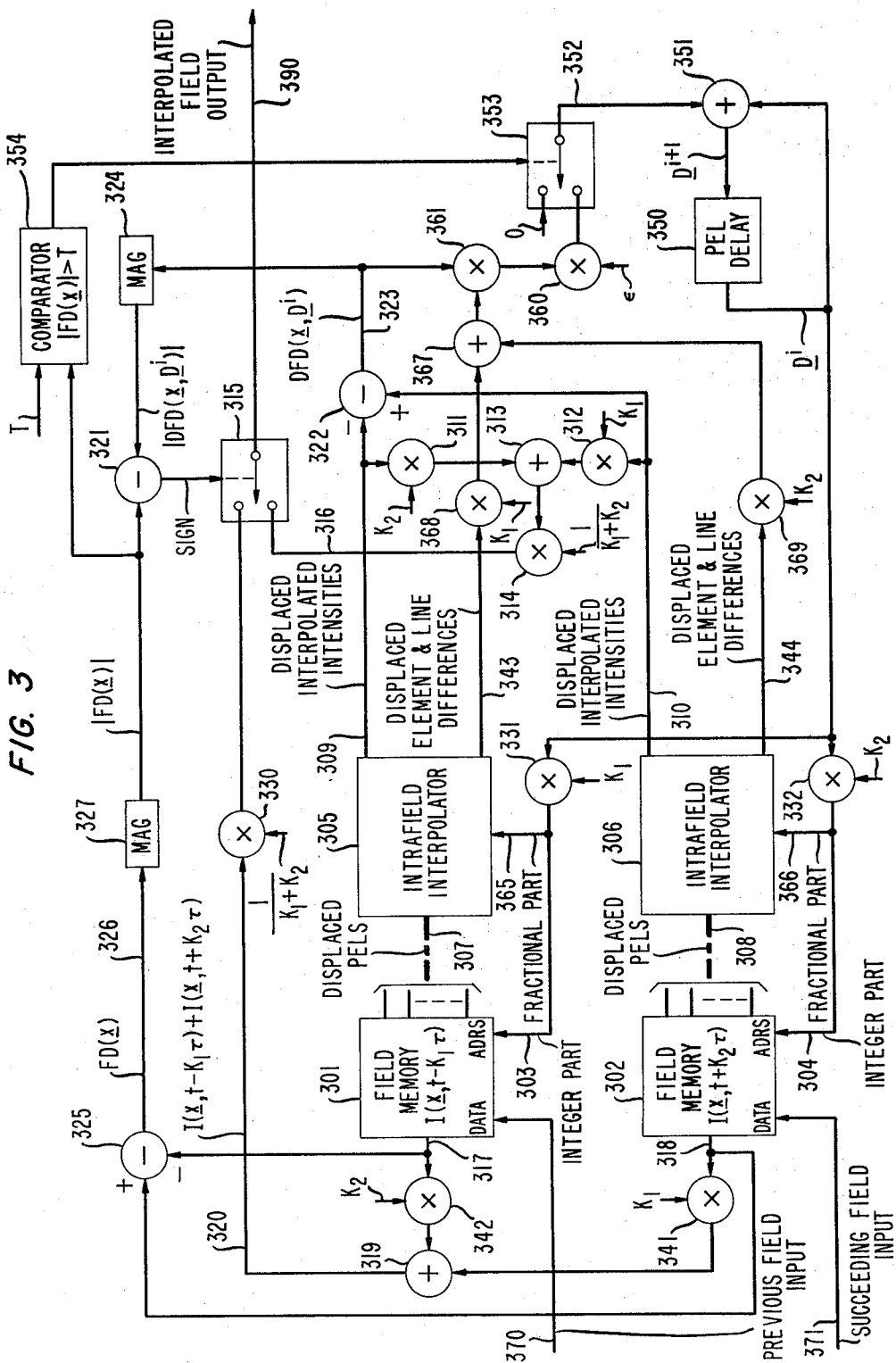
FIG. 3 is a block diagram of apparatus arranged in accordance with the present invention for reconstructing information defining pels in a nontransmitted field of a video signal by processing information derived from preceding and succeeding versions of the picture using motion compensated interpolation.

A block diagram of apparatus arranged to estimate the intensity values of elements in a picture (such as a nontransmitted field of a video signal) using either motion compensated interpolation or fixed position interpolation is shown in FIG. 3. Intensity information representing the versions of the picture which precede and follow the picture being estimated, obtained, for example, by decoding transmitted information representing fields such as fields 201 and 205 of FIG. 2, is entered in random access memories 301 and 302, respectively, via lines 370 and 371. The information is stored within these memories such that intensity values for specific addressed groups of pels can be recovered. For this purpose, each of the memories 301 and 302 includes address inputs 303 and 304, respectively, which receive the integer portions of $K_1D^i$ and $K_2D^i$, which indicate the position in fields 201 and 205 of the same object which is depicted in the pel for which an intensity is being estimated. The products of the displacement estimate $D_i$ stored in a delay element 310 and the factors $K_1$ and $K_2$, respectively, are formed by multipliers 331 and 332. The intensity values for several (usually four) picture elements nearest the addressed displaced locations are output from memories 301 and 302 and applied to a pair of interpolators 305 and 306 via lines 307 and 308, respectively.

Interpolators 305 and 306 are each arranged to use the intensity values output from memories 301 and 302 and the fractional part of the displacement estimates $K_1D^i$ and $K_2D^i$ received on lines 365 and 366, respectively, to compute the intensity values $I(x - K_1D^i, t - K_1\tau)$ and $I(x + K_2D^i, t + K_2\tau)$. This procedure, which is essentially intrafield interpolation "in space", is used because the displacement estimates usually do not indicate a single pel location, but rather a position between pels; a second interpolation step described below, which is interfield interpolation "in time", actually calculates the nontransmitted intensity values being reconstructed. To determine the intensity at the in-between locations, the fractional portions of the displacement estimates are resolved into horizontal and vertical components. The intensity values for pels which bracket the specified location both vertically and horizontally are chosen, and the in-between values computed by linear interpolation. An example of this interpolation is given below. The resulting displaced interpolated intensity values are output on lines 309 and 310.

In order to determine the desired intensity value I(x,t) in accordance with Eq. (1), the intensity values at the displaced locations in fields 201 and 205 are timewise interpolated. For this purpose the outputs on lines 309 and 310 are weighted by factors $K_2$ and $K_1$ in multipliers 311 and 312, and a sum of the weighted values is formed in adder 313. The sum is then scaled by $1/(K_1 + K_2)$ in multiplier 314. From the foregoing, it is seen that more emphasis is given to the intensity value of the field closest in time to field 203, and less emphasis is given the more remote field. The output of multiplier 314 on line 316 which represents the motion compensated interpolated intensity value specified in Eq. (1), is applied to one input of switch 315.

Field memories 301 and 302 are also arranged to make available on lines 317 and 318, respectively, the intensity values $I(x, t - K_1\tau)$ and $I(x, t + K_2\tau)$ for pels in the transmitted fields which are in the same spatial position as the pel presently being processed. To obtain an estimate of I(x,t) by fixed position interpolation, the intensity values are again likewise weighted by forming the sum of $K_1$ times the intensity in field 205 and $K_2$ times the intensity in field 201, and by dividing the sum by $1/(K_1+K_2)$. This is accomplished by applying the signals on lines 317 and 318 to inputs of adder 319 via multipliers 341 and 342 with coefficients $K_1$ and $K_2$, respectively. The output of adder 319 is applied, in turn, to a multiplier circuit 330 via line 320, where the sum is multiplied by the factor $1/(K_1+K_2)$. The resulting value represents the intensity estimate specified in Eq. (10), which is applied to a second input of switch 315.

As mentioned previously, the position of switch 315 is adaptively controlled so as to select either the motion compensated interpolated value on line 316 or the fixed position interpolated value output from multiplier 330, depending upon the relative magnitudes of the frame difference $FD(x)$ and the displaced frame difference $DFD(x,D)$. The magnitude of $FD(x)$ is obtained by forming the differences between $I(x,t-K_1\tau)$ and $I(x,t+K_2\tau)$ in a subtractor 325 and applying the subtractor output on line 326 to a magnitude circuit 327, which disregards sign information. The magnitude of $DFD(x,D)$ is obtained by forming the difference between $I(x-D,t-K_1\tau)$ and $I(x+D,t+K_2\tau)$ in a subtractor circuit 322 and applying the difference to a magnitude circuit 324. $|FD(x)|$ and $|DFD(x,D)|$ are compared in a subtractor circuit 321, and a sign bit output is used to control the position of switch 315. Thus, when the frame difference $FD(x)$ is smaller than the displaced frame difference $DFD(x,D)$ in the local area of the picture being processed, switch 315 is arranged to couple the output of multiplier 330, representing a fixed position interpolation, through the switch to output line 390. On the other hand, if the displaced frame difference is smaller, switch 315 is positioned to couple the output of multiplier 314 representing motion compensated interpolation through to output line 390. The estimated intensity value available on line 390 can be accumulated in a memory, not shown, and the entire process described above repeated for the remaining picture elements in the field. When the entire field has been reconstructed, the contents of the memory may be applied to a display medium in the appropriate time position with respect to the transmitted fields, by multiplexing apparatus, not shown.

As mentioned previously, the displacement estimate $D^i$ is stored in a one pel delay element 350, and recursively updated for each pel. To implement the updating, the output of delay element 350 is applied to one input of an adder 351, which receives an update or correction term as its second input on line 352. The output of adder 351 is the next displacement estimate $D^{i+1}$, which is, in turn, coupled back to the input of delay element 350 to yield the next estimate. Displacement estimates are updated in accordance with Eq. (5) only in the moving area of the picture, and a "zero" update is used otherwise. For this purpose, the position of switch 353 is controlled by the output of comparator 354, the latter serving to determine whether or not $|FD(x)|$ output from magnitude circuit 327 exceeds a predetermined threshold value T. If the threshold is not exceeded, the picture area being processed is not moving. In this circumstance, switch 353 is positioned as shown in FIG. 3 so as to couple a "0" update to adder 351. On the other hand, if the output of comparator 354 indicates that the frame difference does exceed T, a moving area in the picture has been detected, switch 353 is repositioned, and the displacement correction term (from multiplier 360) is coupled through switch 353 to adder 351. The magnitude of the update term is calculated in accordance with Eq. (5) by multiplying second outputs of interpolators 305 and 306 on lines 343 and 344, which represent the displaced element and line differences in the previous and succeeding fields, by $K_1$ and $K_2$, respectively, in multipliers 368 and 369 and forming the sum of these products in adder 367. The sum is multiplied, in turn, by the displaced frame difference output from subtractor 322, and this product is scaled by the factor $\epsilon$ in multiplier 360 before being applied to the second input of switch 353. The manner in which the element and line differences are formed in interpolators 305 and 306 is explained below, in connection with FIG. 4.

After each nontransmitted field has been reconstructed by interpolation in accordance with the present invention, it is necessary to update multiplier coefficients $K_1$ and $K_2$ (when either or both exceeds one) before the next nontransmitted field is processed. For example, in FIG. 2, assuming that fields 201 and 205 are transmitted and fields 202, 203, and 204 are not, then $K_1=K_2=2$ when field 203 is being processed. When field 202 is processed, $K_1=1$ and $K_2=3$. On the other hand, when field 204 is processed, $K_1=3$ and $K_2=1$. Updating of the coefficients $K_1$ and $K_2$ is easily carried out by storing their values in random access memories and by reading out appropriate coefficients under control of clocking circuitry not shown. Information needed to control clocking is derived from sync signals recovered from the transmitted video fields.

Figure 4:
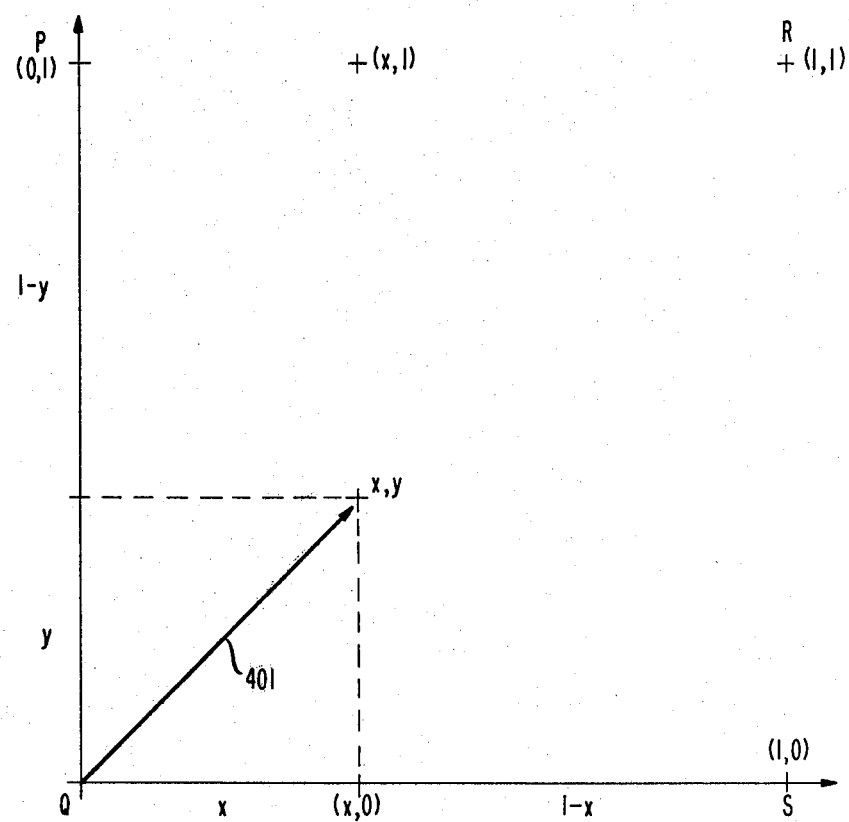
FIG. 4 illustrates spatial interpolation performed in interpolators 305 and 306 of FIG. 3.

An example of the spatial (intrafield) interpolation performed by interpolators 305 and 306 is illustrated graphically in FIG. 4. Locations P, Q, R and S represent four picture elements in a transmitted field of the signal being processed, and $I_P$, $I_Q$, $I_R$ and $I_S$ represent the intensity values at these locations. For convenience, it is assumed that location Q is at the origin of an orthogonal coordinate system, and locations P, R and S are at coordinates (0,1), (1,1) and (1,0), respectively. If the displacement estimate $D^i$ shown by vector 401 has a horizontal component with a fractional portion x, $0<x<1$ and a vertical component with a fractional portion y, $0<y<1$, then the intensity value at location (x,0) is obtained by linear interpolation such that:

$$I_{(x,0)} = (1-x)I_Q + (x)I_S \qquad (11)$$

and the intensity value at location (x,1) is given by:

$$I_{(x,1)} = (1-x)I_P + (x)I_R. \qquad (12)$$

The intensity at location (x,y) is also obtained by interpolation, such that:

$$I_{(x,y)} = (y)I_{(x,1)} + (1-y)I_{(x,0)} \qquad (13)$$

$$= y(1-x)I_P + (y)(x)I_R + (1-y)(1-x)I_Q + \qquad (14)$$

$$(1-y)(x)I_S.$$

From Eq. (14), it is seen that $I_{(x,y)}$ is a weighted sum of the intensities of the pels surrounding the location specified by the displacement estimate, with more weight being given to the closest pels. If desired, other interpolation weights can be used, or additional samples can be used to contribute to the weighting pattern.

The manner in which element and line differences ED and LD are formed in interpolators 305 and 306 can also be illustrated by reference to FIG. 4. For example, if $I_P$, $I_Q$, $I_R$ and $I_S$ represent the intensity values for pels in field 201 at time $t-K_1\tau$ and at spatial locations which surround the location indicated by vector 401, then the element difference ED can be represented by $\frac{1}{2}[(I_R-I_P)+(I_S-I_Q)]$ and the line difference LD can be represented by $\frac{1}{2}[(I_Q-I_P)+(I_S-I_R)]$. This calculation averages the differences, in both the horizontal (element) and vertical (line) directions, for pels surrounding the location for which an intensity value is being estimated. Alternatively, a simple calculation can use a single difference $(I_R-I_P)$ for ED and $(I_Q-I_P)$ for LD. In either event, interpolators 305 and 306 may include suitable arithmetic circuits for forming the desired differences.

The timewise interpolation performed by multipliers 311, 312 and 314 can be further illustrated by several examples. If a series of fields is designated a, b, c, d ... and if every third field a, d, h ... is transmitted, then the intensity value $I_b$ in field b is reconstructed using intensity values $I_a$ and $I_d$ from the transmitted fields a and d as follows:

$$I_b = \approx (2I_a + I_d)$$

The intensity value $I_c$ in field c is given by:

$$I_c = \approx (I_a + 2I_d).$$

As a second example, if every fourth field a, e, i ... in the series is transmitted, the reconstructed intensity value $I_b$ in field b is given by:

$$I_b = \frac{1}{4}(3I_a + I_e)$$

Similarly, the reconstructed values for fields c and d are:

$$I_c = \frac{1}{4}(2I_a + 2I_e), \text{ and}$$

$$I_d = \frac{1}{4}(I_a + 3I_e).$$

Various modifications and adaptations may be made to the present invention by those skilled in the art. Accordingly, it is intended that the invention be limited only by the appended claims. For example, while the preceding description primarily described reconstruction of nontransmitted interlaced fields, it should be clearly understood that the present invention enables efficient reconstruction of information defining a picture or a portion of a picture using similar information derived from preceding and succeeding versions of the picture which include the same spatial area.

What is claimed is:

1. Apparatus for estimating the intensities of elements (pels) in a picture in accordance with information defining intensities of pels in preceding and succeeding versions of the picture including means for determining by interpolation intensities of pels in said picture in accordance with intensities of pels in related locations in said preceding and succeeding versions, characterized in that said determining means includes means for selecting said related locations as a function of the displacement of objects in said picture.

2. The invention defined in claim 1 wherein said apparatus includes:
means for storing a present estimate $D^i$ of said displacement, and
means for recursively updating said estimate for each element in said picture.

3. The invention defined in claim 2 wherein said apparatus includes means for operating said updating means only in moving areas in said picture.

4. The invention defined in claim 3 wherein said apparatus further includes:
means for computing a frame difference FD(x) indicating the intensity difference at spatially corresponding locations in preceding and succeeding versions, and
means for computing a displaced frame difference [DFD(x,D)] indicating the intensity difference at the related locations determined by said displacement estimate,
wherein said selecting means is arranged to select said displaced locations if said displaced frame difference is smaller than said frame difference and to select said corresponding locations otherwise.

5. The invention defined in claim 1 wherein said apparatus further includes:
means for storing the intensity values for pels in said preceding and succeeding versions, and
means responsive to said present displacement estimate for addressing selected ones of said stored values.

6. Apparatus for estimating the intensity values of each element (pel) of a picture being processed by interpolating between the intensity values of related pels in first and second other versions of said picture, including:
means for estimating the displacement of objects in said picture occurring between said other versions, and
means for selecting said related pels in accordance with said displacement estimate.

7. The invention defined in claim 6 wherein said first and second other versions occur at intervals $K_1\tau$ before and $K_2\tau$ after said picture being processed, where $K_1$ and $K_2$ are positive integers and $\tau$ is a predetermined constant, and wherein said related pels are at displaced locations $x-K_1D$ and $x+K_2D$ in said first and second versions, respectively, where x is the vector location of the pel in said presently processed picture and D is the vector representing said displacement estimate per time $\tau$.

8. The invention defined in claim 7 wherein said displacement estimate is recursively updated such that an update term is added to each estimate to form the next estimate, where said update term is a function of the intensity difference at said displaced locations.

9. The invention defined in claim 8 wherein said apparatus further includes means for comparing said intensity difference at said displaced location with the intensity difference at the same location x in said other versions, and
means for operating said selecting means only if said displaced location intensity difference is smaller than said same location intensity difference.

10. Apparatus for reducing the bandwidth needed to transmit a video signal representing a sequence of pictures by encoding the intensity values of pels in ones of said pictures in said sequence and reconstructing missing pictures using information from encoded pictures, including:
means for computing the intensity of pels in a missing picture by interpolating the intensity of pels in corresponding locations in the encoded ones of said pictures which precede and follow said missing picture, and
means for selecting said corresponding locations as a function of the displacement of objects in said picture between said preceding and following pictures.

11. The invention defined in claim 10 further including:
means for storing an estimate $D^i$ of said displacement, and
means for recursively updating said estimate to form a new estimate $D^{i+1}$ by adding a correction term which is a joint function of (a) the intensity difference at said corresponding location, and (b) the spatial gradient of said intensity difference.

12. The invention defined in claim 11 wherein said apparatus further includes:
means for storing the intensity values of pels in said preceding and following pictures, and
means for addressing said stored values in accordance with $D^i$ to obtain the intensities at said corresponding locations.

13. A method of estimating the intensities of elements (pels) in a picture in accordance with information defining intensities of pels in preceding and succeeding versions of the picture including the step of determining by interpolation intensities of pels in said picture in accordance with intensities of pels in related locations in said preceding and succeeding versions,
characterized in that
said determining step includes selecting said related locations as a function of the displacement of objects in said picture.

14. The method defined in claim 13 further including the steps of:
storing a present estimate $D^i$ of said displacement, and
recursively updating said estimate for each element in said picture.

15. The method defined in claim 14 further including the step of operating said updating means only in moving areas in said picture.

16. The method defined in claim 15 further including the steps of:
computing a frame difference FD(x) indicating the intensity difference at spatially corresponding locations in preceding and succeeding versions, and
computing a displaced frame difference [DFD(x,D)] indicating the intensity difference at the related locations determined by said displacement estimate,
wherein said selecting step includes selecting said displaced locations if said displaced frame difference is smaller than said frame difference and selecting said corresponding locations otherwise.

17. The method defined in claim 13 wherein said determining step further includes:
storing the intensity values for pels in said preceding and succeeding versions, and addressing selected ones of said stored values in response to said present displacement estimate.

18. A method of estimating the intensity values of each element (pel) of a picture being processed by interpolating between the intensity values of related pels in first and second other versions of said picture, including the steps of
estimating the displacement of objects in said picture occurring between said other versions, and
selecting said related pels in accordance with said displacement estimate.

19. The method defined in claim 18 wherein said first and second other versions occur at intervals $K_1 \tau$ before and $K_2 \tau$ after said picture being processed, where $K_1$ and $K_2$ are positive integers and $\tau$ is a predetermined constant, and wherein said related pels are at displaced locations $x - K_1 D$ and $x + K_2 D$ in said first and second versions, respectively, where x is the vector location of the pel in said presently processed picture and D is the vector representing said displacement estimate per time $\tau$.

20. The method defined in claim 19 wherein said displacement estimating step includes recursive updating such that an update term is added to each estimate to form the next estimate, where said update term is a function of the intensity difference at said displaced locations.

21. The method defined in claim 20 further including the steps of comparing said intensity difference at said displaced location with the intensity difference at the same location x in said other versions, and
precluding said selecting step if said displaced location intensity difference is larger than said same location intensity difference.

22. A method of reducing the bandwidth needed to transmit a video signal representing a sequence of pictures by encoding the intensity values of pels in ones of said pictures in said sequence and reconstructing missing pictures using information from encoded pictures, including:
computing the intensity of pels in a missing picture by interpolating the intensity of pels in corresponding locations in the encoded ones of said pictures which precede and follow said missing picture, and
selecting said corresponding locations as a function of the displacement of objects in said picture between said preceding and following pictures.

23. The method defined in claim 22 further including the steps of:
storing an estimate $D^i$ of said displacement, and
recursively updating said estimate to form a new estimate $D^{i+1}$ by adding a correction term which is a joint function of (a) the intensity difference at said corresponding location, and (b) the spatial gradient of said intensity difference.

24. The method defined in claim 23 further including the steps of:
storing the intensity values of pels in said preceding and following pictures, and
addressing said stored values in accordance with $D^i$ to obtain the intensities at said corresponding locations.

* * * * *

US004383272C1

(12) EX PARTE REEXAMINATION CERTIFICATE (6692nd)
United States Patent
Netravali et al.

(10) Number: US 4,383,272 C1
(45) Certificate Issued: Mar. 10, 2009

(54) VIDEO SIGNAL INTERPOLATION USING MOTION ESTIMATION

(75) Inventors: Arun N. Netravali, Westfield, NJ (US); John D. Robbins, Aberdeen, NJ (US)

(73) Assignee: Multimedia Patent Trust, Wilmington, DE (US)

Reexamination Request:
No. 90/008,740, Jul. 12, 2007
No. 90/008,789, Aug. 6, 2007

Reexamination Certificate for:
Patent No.: 4,383,272
Issued: May 10, 1983
Appl. No.: 06/253,698
Filed: Apr. 13, 1981

(51) Int. Cl.
*H04N 7/46* (2006.01)

(52) U.S. Cl. .................. 348/416.1; 375/E7.25
(58) Field of Classification Search .................. None
See application file for complete search history.

(56) References Cited

PUBLICATIONS

D. Gabor, *television Compression by Contour Interpolation*, Supplemento AL vol. III, Serie X, Del Nuovo Cimento, 1959.
J. O. Limb, et al., *Combining Intraframe and Frame–to–Frame Coding for Television*, The Bell System Technical Journal, vol. 53, No. 6, Jul.–Aug. 1974.
R. F. W. Pease, *Conditional Vertical Subsampling—A Technical to Assist in the Coding of Television Signals*, The Bell System Technical Journal, vol. 51, No. 4, Apr. 1972.
P. C. J. Hill, *Television Bandwidth Compression by Interpolation*, The Electrical Engineering Department, Imperial College London, Mar. 1960.
Kretzmer, E.R., "Statistics of Television Signals," The Bell Systems Technical Journal, pp. 276–288 (Jul. 1952).
J. O. Limb and R. F. W. Pease, *A Simple Interframe For Coder Video Telephony*, The Bell System Technical Journal, vol. 50, No. 6, Jul.–Aug. 1971.
D. Gabor, et al., *Television Band Compression By Contour Interpolation*, The Proceedings of the Institution of Electrical Engineers, vol. 108, Part B, No. 39, May 1961.
Arun N. Netravali and John O. Limb, *Picture Coding: A Review*, Proceedings of the IEEE, vol. 68, No. 3, Mar. 1980.
Limb et al., *Exchange of Spatial and Temporal Resolution in Television Coding*, The Bell System Technical Journal, Jan. 1971.

*Primary Examiner*—Ovidio Escalante

(57) ABSTRACT

Information defining elements of a picture is estimated by interpolation using information from related locations in preceding and succeeding versions of the picture. The related locations are determined by forming an estimate of the displacement of objects in the picture. Displacement estimates are advantageously formed recursively, with updates being formed only in moving areas of the picture. If desired, an adaptive technique can be used to permit motion compensated interpolation or fixed position interpolation, depending upon which produces better results.

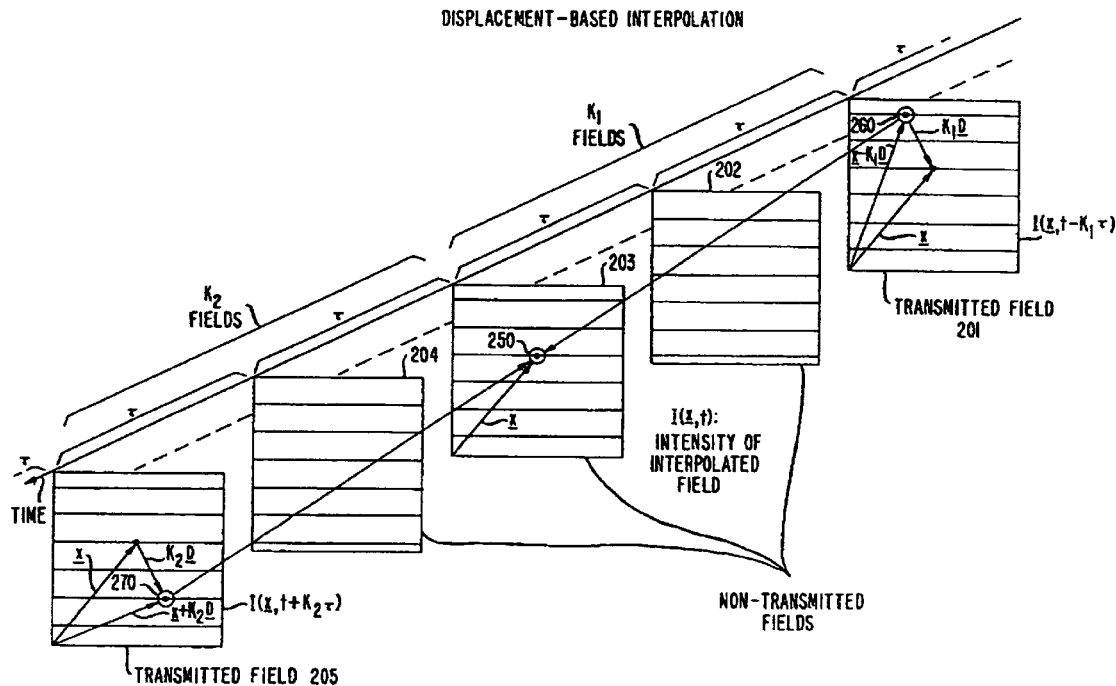

EX PARTE REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

Claim 13 is now disclaimed.

Claims 1–12 and 14–24 were not reexamined.

* * * * *